Oct. 27, 1936.   J. M. WILKINS   2,058,747

VALVE

Filed June 9, 1933

Inventor

James M. Wilkins

By Cushman, Darby & Cushman

Attorneys

Patented Oct. 27, 1936

2,058,747

UNITED STATES PATENT OFFICE 2,058,747

VALVE

James M. Wilkins, Decatur, Ill., assignor to Mueller Co., Decatur, Ill., a corporation of Illinois Application June 9, 1933, Serial No. 675,136

3 Claims. (Cl. 251—93)

The present invention relates to valves and, more particularly, to an improvement in plug valves wherein the seating surfaces of the plug member and casing member are lubricated by forcing lubricant under pressure between these surfaces.

Lubricated valves of this type have heretofore been proposed wherein lubricating grooves or channels are provided in the seating surfaces, these grooves being supplied with grease under pressure in order to maintain the seating surfaces tightly sealed when the plug member of the valve is in either open or closed position. The arrangement of the seating surface grooves and the supply passage and pressure means of these prior valves has been relatively complicated.

Valves of the lubricated type are intended to be economical in manufacture because, in their production, the seating surfaces of the valve are not exactly machined or lapped and irregularities in these surfaces are sealed by the lubricant with which the valve is supplied. Obviously, if the lubricating grooves and passages are of a complicated arrangement, the economies effected by eliminating the necessity of fine machining may be more than offset.

The principal object of the present invention is to provide a lubricated valve including lubricating grooves in the seating surfaces, supply passages and pressure means for supplying lubricant and maintaining it under pressure, the grooves, passages and pressure means being so arranged that the valve will be of relatively simple construction and may be manufactured at less expense than has heretofore been possible.

Still another object of the invention is to provide an arrangement of lubricating grooves and passages and means to exert pressure upon the lubricant therein, all of which are so arranged that the lubricant will be maintained at a maximum and constant pressure.

A further object of the invention is to provide a valve wherein the axial ends of the plug member are completely sealed against leakage, regardless of the position of the plug member.

A still further object of the invention is to provide a valve wherein sufficient pressure may be exerted upon the plug member to slightly lift it from its seat in the casing member in the event that the plug member becomes seized with respect to the casing member. In connection with this object, means is also provided to normally hold the plug member tightly seated with respect to the casing member and to obviate all possibility of grease escaping from the valve when the plug member is lifted from its seat.

Valves of the type wherein the plug member may be lifted from its seat have heretofore been provided, but the construction of these valves, and particularly the arrangement of the packing, is such that it is difficult to raise the plug member from its seat. These difficulties are overcome by the valve of the present invention.

Other objects and advantages will be apparent from the following specification and drawing, wherein.

Figure 1:
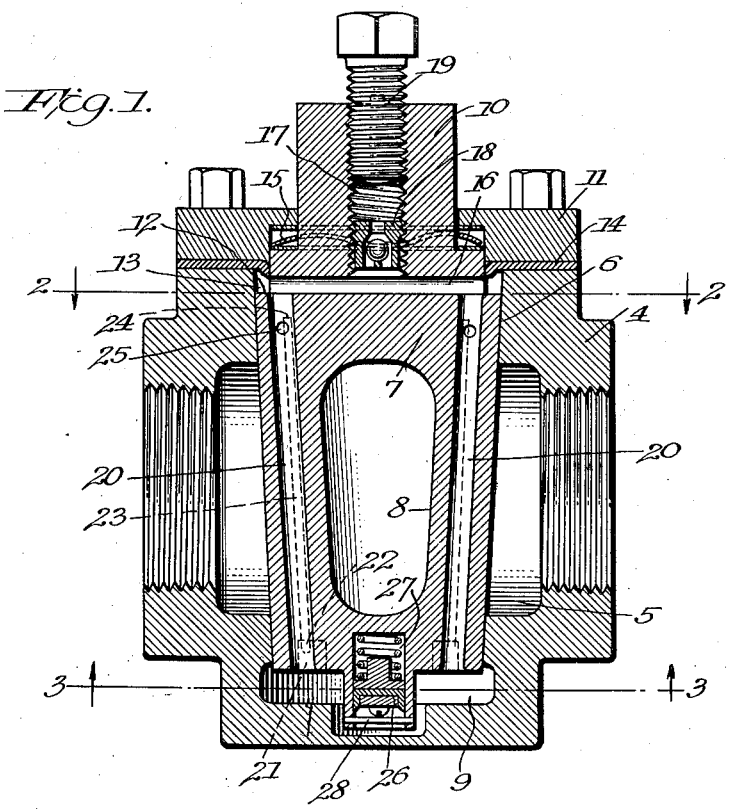
Figure 1 is an axial section through the valve.

The valve comprises a body or casing member 4 provided with a passageway 5 for the flow of fluid and including a transverse tapered seat 6. A plug member 7 is positioned upon the seat 6 in the casing member and is provided with the usual port or aperture 8. The casing member 4 is provided with a lower chamber 9 into which the lower end of the plug member 7 extends and the upper portion of the casing member is adapted to be closed about the stem 10 of the plug member by means of a plate 11 which is secured to the casing member by machine screws or the like.

It will be understood that the use of the terms "upper" and "lower" with respect to various parts of the valve is intended to be relative only and refers merely to the position of the valve as shown in the drawing.

The upper portion of the plug member 7 is stepped as shown at 12 in order to provide a sealing chamber 13 about the upper portion of the plug. A cup-shaped washer 14 is positioned between the casing member 4 and the plate 11, the inner flange of the washer extending into contact with the stepped portion 12 of the plug member substantially in an axial plane to form a seal and thereby prevent leakage upwardly about the stem 10 of the plug member. The stem 10 is preferably of less diameter than the stepped portion 12 and means to normally hold the plug member tightly seated, preferably comprising a spring washer 15, is positioned about the lower end of the stem and beneath a shoulder on the plate 11 to hold the plug member 7 downwardly upon its seat. Washers may be provided above and below the spring washer 15 as shown.

The plug member 7 is provided with a transverse passageway 16 in its upper portion, the ends of the passageway 16 opening into the sealing chamber 13. A central vertical bore 17 extends upwardly through the valve stem 10 from the transverse passageway 16. The bore 17 is threaded and has a check valve fitting 18 threaded into its lower end. A set screw or feeding screw 19 closes the upper end of the bore 17.

In order to lubricate the valve a stick of grease or the like may be inserted in the bore 17 and rotation of the set screw 19 will force the lubricant downwardly past the check valve in the fitting 18 to the transverse passageway 16 and into the sealing chamber 13. The check vlave in the fitting 18 will prevent grease from passing outwardly through the bore 17.

Two passages 20 extend vertically through the plug member 7. The upper ends of the passages communicate with the transverse passage 16 and the lower ends of the passages open to the chamber 9 in the lower portion of the casing member 5. The vertical passages 20 are preferably diametrically opposite each other.

Figure 2:
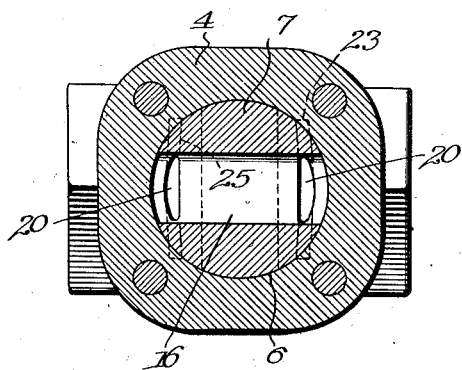
Figure 2 is a sectional view taken on the line 2—2 of Figure 1.
Figure 3:
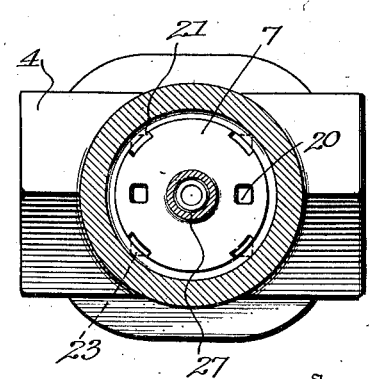
Figure 3 is a sectional view taken on the line 3—3 of Figure 1.

The lower end of the plug member 7 is provided with indentations or pockets 21 open to both the chamber 9 and to the seating surfaces between the plug member and the casing member. The indentations or pockets 21 are preferably spaced 90 degrees apart about the plug member 7 and, when the plug member is in closed position as shown in the drawings, the indentations 21 are directly opposite and communicate with the lower ends 22 of longitudinal grooves 23 in the seating surfaces of the casing member 4. As best shown in Figure 1, the lower ends 22 of the grooves 23 terminate at such a point in the seating surface that they do not communicate with the chamber 9 except when aligned with the indentations 21. The grooves 23 extend longitudinally of the casing member 4 to a point above the passageway 5 thereof but their upper ends 24 are beneath and do not communicate with the sealing chamber 13. Apertures 25 may be provided in the plug member 7 and extending from the upper portion of the vertical passageways 20 to the sealing surface of the plug member 7. The ports 25 are so positioned that they will be aligned with the grooves 23 when the indentations 21 are aligned with the grooves, as shown in Figures 1 and 2.

When grease or other lubricant is supplied to the transverse passageway 16 and the set screw or feeding screw is rotated downwardly in the bore 17, the grease will obviously move downwardly through the vertical passageways 20 to the chamber 9 and will thence move upwardly into the indentations 21 and the grooves 23 in the casing member. Grease will also move through the ports 25 to the upper ends of the grooves 23. Grease will move outwardly from the grooves 23 and also from the sealing chambers 9 and 13 to fill irregularities in the seating surfaces.

In order to maintain the grease in the passages and chambers under proper pressure, a spring pressed piston 26 is provided in a socket 27 opening from the lower end of the plug 7. The piston is normally pressed downwardly by its spring, its extreme downward movement being limited by a stop pin 28 in the lower end of the socket 27. It will be obvious that the action of the spring pressed piston 26 will be to maintain the grease under proper pressure.

The chamber 9, filled with grease, serves as a seal for the lower end of the plug 7 and prevents leakage past that end of the plug. The upper sealing chamber 13 seals the upper end of the plug.

It will be observed that the longitudinal grooves 23 are so positioned that when the plug member 8 is in closed position, as shown in Figure 1, a groove 23 will be between each side of the passageway 5 and the port 8 through the plug member. In this position, the indentations or pockets 21 and apertures 25 of the plug member will be aligned with the grooves and the grease in the grooves will be under pressure. Leakage about the plug will thus be entirely prevented.

Suitable indicia may be provided upon the valve stem 10 and the plate 11 or casing member 6 to indicate when the plug member 7 is in either open or closed position.

When the plug is rotated from closed position toward open position to even a slight degree, all of the indentations 21 and apertures 25 in the plug member 7 will simultaneously begin to move out of alignment with their respective cooperating grooves 23. During the movement of the plug to open position, two diametrically opposite grooves 23 will be exposed to the port 8 and passageway 5, but since neither of these grooves is at this time subject to the pressure in the lubricating passages of the plug member, no material amount of grease will escape from these exposed grooves. The rotation of the plug member will cause grease from the grooves to be wiped or smeared upon the seating surface of the plug member to increase the efficiency of the seal.

When the plug member 7 is in open position, the indentations 21 will again be aligned with grooves 23 so as to maintain the grease in these grooves under pressure.

Should the plug member 7 become stuck or seized in the casing member, it may be released by rotating the set screw or feeding screw 19 downwardly in the bore 17 to increase the pressure upon the grease in the valve. Because of the relatively large area of the plug member exposed to the pressure of the grease in the chamber 9, the plug member will be lifted very slightly upwardly with respect to the casing member and against the action of the spring washer 15. The plug member may then be turned.

Because of the cup-shape of the packing washer 14, no grease may move outwardly from the sealing chamber 13 along the stem of the plug member, since any increase in the pressure of the grease in the chamber 13 causes the depending flange of the cup-shaped washer to be forced more tightly into engagement with the stepped portion 12 of the plug member.

It will be obvious that the spring washer 15 will normally hold the plug member upon its seat but that neither the washer 15 nor the cup-shaped washer 14 will hold the plug member from lifting from its seat when sufficient pressure is applied to the lubricant.

The arrangement of the grooves 23 in the present valve whereby these grooves do not extend into communication with the sealing chamber 13, permits greater pressure to be exerted upon the grease in these grooves. That is to say, higher pressure can be built up in the stub end grooves than would be the case if these grooves were part of an endless circuit.

It will be understood that the invention is not limited to the details of construction shown in the drawing and described in the specification and that the examples of the use of the device which have been given do not include all of the uses of which the device is capable; also, that the phraseology employed in the specification is for the purpose of description and not of limitation.

I claim:

1. A valve comprising a casing member having a passageway for flow of fluid, a tapered seat formed transversely of the passageway, a tapered plug member rotatably disposed in the seat and having a port therethrough, a lubricant containing chamber in the casing member at the larger end of the tapered plug member, a lubricant containing passage in the valve and communicating with the chamber, means to exert pressure upon the lubricant in the passage to raise the plug member from the seat, means at the larger end of the plug member to normally hold the latter upon the seat, and a sealing ring in the chamber having its inner edge inclined toward the smaller end of the plug member and contacting with the plug member to maintain a seal between the plug member and casing member.

2. A valve comprising a casing member having a passageway for flow of fluid and a tapered seat formed transversely of the passageway, said seat being closed at the smaller end thereof by the wall of the casing member, a tapered plug member rotatably disposed in the seat and having a port therethrough, lubricant containing chambers in the casing member at each end of the plug member, a passageway in the plug member to place the chambers in communication, means to exert pressure upon the lubricant in the chamber at the smaller end to lift the plug member from the seat, and a sealing ring in the chamber at the larger end having its inner edge inclined toward the smaller end of the plug member and contacting with the plug member to maintain a seal between the plug member and casing member.

3. A valve comprising a casing member having a passageway for flow of fluid and a tapered seat, a passageway for flow of fluid and a tapered seat formed transversely of the passgeway, a tapered plug member rotatably disposed in the seat and having a port therethrough, lubricant containing chambers in the casing member at each end of the plug member, a passageway in the plug member to place the chambers in communication, means to exert pressure upon the lubricant in the chamber at the smaller end to lift the plug member from the seat, a sealing ring in the chamber at the larger end to prevent leakage of lubricant past that end of the plug member, the inner perimeter of the ring being smaller than the circumference of the portion of the plug member with which it contacts so as to position the inner edge portion of the ring at an angle with respect to the plug member, and spring means to normally hold the plug member upon its seat.

JAMES M. WILKINS.